United States Patent
Sherman et al.

(10) Patent No.: US 11,407,028 B2
(45) Date of Patent: Aug. 9, 2022

(54) SYNTACTIC METAL MATRIX MATERIALS AND METHODS

(71) Applicant: Powdermet, Inc., Euclid, OH (US)

(72) Inventors: Andrew Sherman, Mentor, OH (US); Brian Doud, Euclid, OH (US)

(73) Assignee: POWDERMET, INC., Euclid, OH (US)

( * ) Notice: Subject to any disclaimer, the term of this patent is extended or adjusted under 35 U.S.C. 154(b) by 1066 days.

(21) Appl. No.: 16/030,082

(22) Filed: Jul. 9, 2018

(65) Prior Publication Data

US 2019/0015902 A1 Jan. 17, 2019

Related U.S. Application Data

(60) Continuation of application No. 14/752,166, filed on Jun. 26, 2015, now Pat. No. 10,092,954, which is a
(Continued)

(51) Int. Cl.
*B22F 3/11* (2006.01)
*B32B 5/18* (2006.01)
(Continued)

(52) U.S. Cl.
CPC ............ *B22F 3/1112* (2013.01); *B21D 31/00* (2013.01); *B22F 3/16* (2013.01); *B32B 5/16* (2013.01);
(Continued)

(58) Field of Classification Search
None
See application file for complete search history.

(56) References Cited

U.S. PATENT DOCUMENTS

| 3,781,170 A | 12/1973 | Nakao et al. |
| 4,775,598 A * | 10/1988 | Jaeckel ................. B22F 1/0051 419/19 |

(Continued)

FOREIGN PATENT DOCUMENTS

| GB | 1379157 | 1/1975 |
| WO | 2011082102 | 7/2011 |

OTHER PUBLICATIONS

International Search Report and Written Opinion in corresponding PCT Application No. PCT/US2013/035602 (dated Mar. 4, 2011).
(Continued)

*Primary Examiner* — George Wyszomierski
(74) *Attorney, Agent, or Firm* — Ulmer & Berne, LLP; Brian E Turung

(57) ABSTRACT

A syntactic metal foam composite that is substantially fully dense except for syntactic porosity is formed from a mixture of ceramic microballoons and matrix forming metal. The ceramic microballoons have a uniaxial crush strength and a much higher omniaxial crush strength. The mixture is continuously constrained while it is consolidated. The constraining force is less than the omniaxial crush strength. The substantially fully dense syntactic metal foam composite is then constrained and deformation worked at a substantially constant volume. The deformation working is typically performed at a yield strength that is adjusted by way of selecting a working temperature at which the yield strength is approximately less than the omniaxial crush strength of the included ceramic microballoons. This deformation causes at least work hardening and grain refinement in the matrix metal.

25 Claims, 2 Drawing Sheets

Related U.S. Application Data division of application No. 13/445,810, filed on Apr. 12, 2012, now Pat. No. 9,096,034.

(60) Provisional application No. 61/474,712, filed on Apr. 12, 2011.

(51) Int. Cl.
| | |
|---|---|
| B21D 31/00 | (2006.01) |
| C22C 32/00 | (2006.01) |
| C22C 49/00 | (2006.01) |
| C22C 49/11 | (2006.01) |
| C22C 49/06 | (2006.01) |
| B32B 5/16 | (2006.01) |
| B32B 5/20 | (2006.01) |
| B22F 3/16 | (2006.01) |
| C22C 1/10 | (2006.01) |

(52) U.S. Cl.
CPC ............... *B32B 5/18* (2013.01); *B32B 5/20* (2013.01); *C22C 1/1084* (2013.01); *C22C 32/0031* (2013.01); *C22C 32/0036* (2013.01); *C22C 32/0078* (2013.01); *C22C 49/00* (2013.01); *C22C 49/06* (2013.01); *C22C 49/11* (2013.01); *B22F 2003/1106* (2013.01); *B22F 2998/10* (2013.01)

(56) References Cited

U.S. PATENT DOCUMENTS

| | | |
|---|---|---|
| 7,037,865 B1 | 5/2006 | Kimberly |
| 7,041,250 B2 | 5/2006 | Sherman |
| 8,110,143 B2 | 2/2012 | Rabiei |
| 8,535,604 B1 | 9/2013 | Baker |
| 8,815,408 B1 * | 8/2014 | Cochran .................. B32B 5/18 428/613 |
| 2003/0104147 A1 * | 6/2003 | Bretschneider ....... C04B 41/009 428/34.7 |
| 2003/0180171 A1 | 9/2003 | Artz et al. |
| 2004/0137259 A1 | 7/2004 | Pabla et al. |
| 2006/0065330 A1 | 3/2006 | Cooper et al. |
| 2008/0223539 A1 | 9/2008 | Cooper et al. |
| 2010/0192808 A1 | 8/2010 | Datta et al. |
| 2011/0160104 A1 | 6/2011 | Wu et al. |
| 2016/0194762 A1 * | 7/2016 | Schaedler ............. C22C 1/0433 428/220 |

OTHER PUBLICATIONS

Bratt et al., "Mechanical Testing of Glass Hollow Microspheres", Materials Science Research, vol. 15, pp. 441-447 (1983).

Mondahl et al., "Cenosphere filled aluminum syntactic foam made through stir-casting technique", Composites; Part A 40, pp. 279-299 (2008).

Elert, "Density of Glass", Density of Glass—The Physics Factbook, N.p., 2004. Web. 31 (Jul. 2017).

Balch et al., "Plasticity and damage in aluminum syntactic foams deformed under dynamic and quasi-static conditions", Materials Science and Engineering A. 391, pp. 408-417 (2005).

Kiser et al., "The mechanical response of ceramic microballoon reinforced aluminum matrix composites under compressive loading", Acta Metallurgica, vol. 47, No. 10, pp. 2685-2694 (1999).

Tao et al., "Compressive behavior of Al matrix syntactic foams toughened with Al particles", Scripta Materiala, vol. 61, pp. 461-464 (2009).

Xu et al., "Ti Matrix Syntactic Foam Fabricated by Powder Metallurgy: Particle Breakage and Elastic Modulus", Journal of Materials, vol. 63, No. 1, pp. 43-47 (Feb. 2011) from www.tms.org/jom.html.

* cited by examiner

SYNTACTIC METAL MATRIX MATERIALS AND METHODS

CROSS-REFERENCES TO RELATED APPLICATIONS

This application is a continuation of U.S. Ser. No. 14/752,166 filed Jun. 26, 2015, now U.S. Pat. No. 10,092,954, issued Oct. 9, 2018, which in turn is a divisional of U.S. Ser. No. 13/445,810 filed Apr. 12, 2012, now U.S. Pat. No. 9,096,034, issued Aug. 4, 2015, which in turn claims the benefit of U.S. Provisional Application Ser. No. 61/474,712 filed Apr. 12, 2011.

STATEMENT REGARDING FEDERALLY SPONSORED RESEARCH OR DEVELOPMENT

This invention was made with government support under W56HZV-07-C-0518, awarded by the United States Army. The government has certain rights in the invention.

BACKGROUND OF THE INVENTION

Field of the Invention

The claimed subject matter relates to methods and compositions involving high energy absorption syntactic metal foams containing substantially uniformly distributed ceramic microballoons in a metallic matrix.

The Related Art

Various syntactic metal foams and methods for forming them had been proposed. Foamed materials wherein the pores are formed by the inclusion of hollow microballoons are generally described as syntactic foams. The size, volume fraction, and uniformity of the syntactic porosity are determined by the included microballoons.

One type of syntactic metal foam is exemplified by Rohatgi U.S. Pat. No. 5,899,256 wherein it is proposed, inter alia, that a mass of nickel coated cenosphere fly ash particles may be infiltrated with molten aluminum to form an aluminum-cenosphere fly ash composite. The nickel coating on the fly ash is said to enhance the wetting of the fly ash by the molten matrix metal, thereby reducing the pressure required to force the molten metal through the body of fly ash. Rohatgi acknowledges that melt infiltration results in non-uniform properties in the composite, apparently because the molten metal washes the nickel coating off the fly ash.

Rohatgi U.S. Pat. No. 5,228,494, which is hereby incorporated herein by reference as though fully set forth hereat, also proposes to use fly ash in the production of cast metal-fly ash composites. This is a melt infiltration process. It is stated, without elaboration or exemplification that such cast metal-fly ash composites can be subsequently hot worked and/or cold worked.

Inabata U.S. Pat. No. 4,939,038, which is hereby incorporated herein by reference as though fully set forth hereat, proposes, inter alia, combining coated hollow microspheres with a matrix forming powder, and heating the mixture to form a composite.

Nakao U.S. Pat. No. 3,781,170, which is hereby incorporated herein by reference as though fully set forth hereat, proposes the production of lightweight metal composite material from a mixture of hollow microspheres in a light metal matrix powder. Heat and pressure are applied to the mixture. The pressure is continuously adjusted as the mixture shrinks during processing.

The properties of many sinterable materials, such as melting points, softening points, onset sintering temperatures, and liquidus and solidus points are well known and available from various published sources. Well known conventional procedures are available for determining such properties where they are not readily available in published references.

Conventional solid state processing of powdered metals usually involves heating a green preform to at least the onset sintering temperature of the matrix material, but often below any temperature at which a liquid phase forms. Conventional powdered metal consolidation often takes place without the formation of a liquid phase. Transient liquid phase sintering is a solid state process that involves heating the powdered matrix forming metals to a temperature at which a liquid phase initially appears, but then disappears before sintering is completed. There is no detectable solid phase corresponding to the transient liquid phase in the final product. See, for example, Sherman et al. U.S. Pat. No. 7,041,250, which is hereby incorporated herein by reference as though fully set forth hereat. In conventional liquid phase sintering, a liquid phase forms during sintering and does not disappear, so there is a solid phase corresponding to the liquid phase in the final compact.

The use of inorganic non-metallic (ceramic) microballoons in a syntactic metal foam had generally been considered to require careful handling of this foam during and after its formation to avoid crushing the microballoons. Such crushing is known to increase the density of the foam in a non-uniform and uncontrolled way by eliminating or diminishing the syntactic porosity to an unpredictable degree within various random regions of the foam. This randomness renders the properties of the foam unpredictable, and, therefore, unreliable.

Unconstrained ceramic microballoons have measurable average unconstrained uniaxial crush strengths. Previously, it had generally been understood that the deformation processing of syntactic metal foam composites at or above the average unconstrained uniaxial crush strength of the included ceramic microballoons would crush enough of the ceramic microballoons to have a significant adverse effect on the physical properties of the final syntactic metal foam composite product. This had substantially limited the use of deformation processing in shaping or achieving desired physical properties in syntactic metal foam composites.

There was a well-recognized and longstanding need for syntactic metal foam composites that can be deformation processed at or above the average unconstrained uniaxial crush strength of the included ceramic microballoons. There was also a well-recognized and longstanding need for syntactic metal foam composite forming methods that would allow such composites to be shaped without fracturing or otherwise impairing their suitability for use.

The density of syntactic metal foam decreases as the rate of ceramic microballoon loading increases for a given average ceramic microballoon size. Also, for a given loading rate the density of syntactic metal foam composites decreases as the wall thickness of the included ceramic microballoons decreases. Previously, it had been generally understood that for a given average particle size many of the desirable physical properties of syntactic metal foam composites tended to decrease as the rate of ceramic microballoon loading increased. Further, it had also been understood that for a given average particle size many of the desirable physical properties of syntactic metal foam composites tended to decrease as the wall thickness of the included ceramic microballoons decreased. There was a well-recognized and long standing need for lightweight syntactic metal foam composites with high thin walled ceramic microballoon loading rates.

There was a well-recognized need for methods whereby syntactic metal foam composites could be formed with substantially uniformly distributed closed cells, and closely controlled sphere volume fraction. Also, there had been a well-recognized need for high strength syntactic metal foam composites with substantially uniform and predictable physical properties. Such physical properties include, for example, ductility, high stiffness, and yield strengths at densities of, for example, from 40 to 65 percent of those of the pore free matrix metals.

There was a need for ductile, porous, closed-cell metallic structures having a uniform and controlled distribution of matrix metal and empty (pore) phases. Further, there was a need for a method of producing a reduced density metallic material that could be substituted or used for energy adsorption, ballistic and blast protection, lightweighting applications, EMI shielding, packaging, and structural applications. Previous expedients generally offered, for example, poor control over microballoon packing and distribution, or limited strength, or lack of uniform ductile properties, or relatively high densities, or poor workability or some combination of these.

In the event of a conflict of any nature between the teachings of references incorporated herein by reference, and the teachings of this disclosure, it is intended that the teachings of this disclosure shall control.

These and other shortcomings of the prior art have been overcome according to the present invention. There is a need for the present embodiments that enable a highly uniform distribution of ceramic microballoons with excellent control over sphere volume fraction, while enabling syntactic metal foam composite embodiments with desirable, uniform, predictable properties to be produced. Embodiments are capable of being deformation worked at or above the average unconstrained uniaxial crush strength of the included ceramic microballoons. Such embodiments exhibit, for example, ductility, excellent strength, compression loading, energy absorption, workability, and low density properties.

SUMMARY

Embodiments of the claimed subject matter provide, for example, improved shape and shaping capabilities, low densities, high ductility, energy adsorption, strengths, formability, and workability.

As used herein, unless otherwise indicated, "microballoon" is intended to indicate the same thing as "hollow microsphere." That is, "microballoons" are hollow and approximately spherical.

As used herein, unless otherwise indicated, "ceramic" is intended to include all forms of inorganic non-metallic materials, including, for example, carbon, glass, graphite, metallic oxides, metallic carbides, metallic nitrides, and metal silicates. Such ceramics generally have softening points above the maximum temperatures encountered during the formation and working of the syntactic metal foam bodies, and during use of the finished composites. As used herein, unless otherwise indicated, "average unconstrained uniaxial crush strength" or words of similar import are intended to mean, with respect to ceramic microballoons, the average amount of uniaxial force that the ceramic microballoons can withstand without crushing. Uniaxial force is force that is applied from only one direction, as, for example, when a single microballoon is trapped and compressed between two spaced apart parallel plates until it breaks. Such a single microballoon trapped between 2 plates is unconstrained because there is no force being applied to it from any other direction.

As used herein, unless otherwise indicated, "average omniaxial crush strength" or words of similar import are intended to mean, with respect to ceramic microballoons, the average amount of omniaxial force that the ceramic microballoons can withstand without crushing. Omniaxial force is applied more or less uniformly from all directions. The average omniaxial crush strength is generally higher by 2 to 4, or 6, or 8, or more times, in certain embodiments, than the average unconstrained uniaxial crush strength. Omniaxial force may be applied, for example, by immersing a single microballoon in a liquid, and then pressurizing the liquid. Such a single microballoon sees approximately equal force applied to it from every direction by the liquid. It is constrained by the liquid.

The average unconstrained uniaxial crush strengths, and average omniaxial crush strengths of ceramic microballoons are easily determined by those skilled in the art using well known and widely available testing procedures. The yield strengths of metal matrix materials at various temperatures are generally readily available from published sources, and where not readily available are easily determined by those skilled in the art using conventional testing procedures.

As used herein, unless otherwise indicated, "syntactic porosity" or words of similar import are intended to mean closed cell porosity that results from the presence of ceramic microballoons in a metallic matrix, and "non-syntactic porosity" or words of similar import are intended to mean open or closed cell porosity in a metallic matrix that does not result from the presence of ceramic microballoons.

As used herein, unless otherwise indicated, "syntactic metal foam body" or words of similar import are intended to mean those syntactic metal foams in which there is both syntactic porosity and non-syntactic porosity in the metal matrix, and "syntactic metal foam composite" or words of similar import are intended to mean syntactic metal foams in which substantially all of the porosity in the matrix metal is syntactic porosity. Generally, ceramic microballoons must survive processing intact (unbroken) in order to provide syntactic porosity. Broken or ruptured ceramic microballoons tend to at least partially fill with matrix metal.

As used herein, unless otherwise indicated, "syntactic metal foam" or words of similar import are intended to be inclusive of both syntactic metal foam bodies and composites.

As used herein, unless otherwise indicated, "deformation worked," "deformation working," or words of similar import are intended to mean the physical shaping of a syntactic metal foam composite by the application of a deformation force that is equal to or greater than the yield strength of the matrix metal at the working temperature at which the force is being applied, but less than the average omniaxial crush strength of the included ceramic microballoons. Deformation working is carried out at a substantially constant volume, and generally at an elevated temperature. Constant volume is achieved by constraining the syntactic metal foam composite as it is deformed.

As used herein, unless otherwise indicated, "constrained deformation" or words of similar import are intended to mean the deformation working of a syntactic metal foam composite at a substantially constant volume. By reason of being constrained to a substantially constant volume, the force that the ceramic microballoons see is generally omniaxial.

As used herein, "deformation formed," "deformation forming," or words of similar import are intended to mean, unless otherwise indicated, the densification of a syntactic metal foam body to form a syntactic metal foam composite by the application of densification force. Deformation forming is carried out in one or more steps on a syntactic metal foam body that is continuously constrained while its volume is reduced until a desired degree of densification is achieved. The densification is carried out at an elevated temperature that is in the range between the liquidus temperature of the matrix metal and a temperature that is at approximately three-quarters of the liquidus temperature measured in degrees centigrade. The applied densification force is generally between the average unrestrained uniaxial and average omniaxial crush strengths of the included microballoons.

As used herein, unless otherwise indicated, "fully dense," "full density" or words of similar import, as applied to a syntactic metal foam composite, are intended to mean the metal matrix in the syntactic metal foam composite, exclusive of syntactic porosity, is at its substantially full theoretical pore free density. That is, the metal matrix is substantially free of non-syntactic porosity. Non-syntactic porosity results from something other than the included ceramic microballoons, and is generally irregular in shape and distribution. The properties of a composite that contains non-syntactic porosity are not as reliable or predictable as those with substantially only syntactic porosity. A metal matrix is considered to be substantially free of non-syntactic porosity when there is no non-syntactic porosity visible in a cross-section of the matrix metal at a 3 power magnification, and in some further embodiments, under a 10 power magnification.

Deformation forming generally eliminates substantially all non-syntactic porosity from syntactic metal foam bodies to provide substantially fully dense syntactic metal foam composites. Such syntactic metal foam bodies are typically brittle. According to further embodiments, these syntactic metal foam composites are also subsequently mechanically deformed to produce refined and improved structures. Deformation working of syntactic metal foam composites changes the character of these composites from brittle to ductile, and increases the amount of energy required to crush these composites (energy absorption capacity) from at least about 1.5 to 2, or 3, or 4, or 5, or 10, or more times, according to certain embodiments.

Ductile syntactic metal foam composites exhibit both the physical properties that are characteristic of syntactic composites and the ductility that is characteristic of non-porous embodiments of the matrix forming metals. The substantial amount of energy that is required to crush deformation worked syntactic metal foam compositions means that these composites are well suited for use as armor, in crush zones, and the like. Ductile syntactic metal foam composites can be shaped by conventional machining and forming operations into many very lightweight useful articles. For example, thin sheets of such composites may be warm formed into shells for electronic equipment without significantly reducing the syntactic porosity in the sheets. Such conventional machining and forming operations are likely to fracture brittle syntactic metal foam composites.

Deformation working of substantially fully dense syntactic metal foam composites is accomplished at a substantially constant volume and at a temperature adjusted matrix metal yield strength that is approximately at or below the omniaxial crush strength of the included ceramic microballoons. The deformation working of such a fully dense syntactic metal foam composite must be done at constant volume (constrained deformation) or an unacceptably large percentage (15 percent or more) of the included ceramic microballoons will likely be crushed. Applying a deformation force that is at or above about the yield strength of the matrix metal, but below the omniaxial crush strength of the ceramic microballoons at the deformation temperature will crush an unacceptable amount of the included ceramic microballoons in an unrestrained billet, but not in a constrained billet. Such crushing will not be uniform throughout the unconstrained billet, resulting in unpredictable and unreliable physical properties.

According to certain embodiments, deformation worked syntactic metal foam composites comprises a metallic matrix phase that exhibits physical properties, which are characteristic of having been deformed in situ. Such characteristics include, for example, deformation and recrystallization, work-strengthening, and grain refinement. Deformation in situ occurs when the shape of a substantially fully dense (except for syntactic porosity) syntactic metal foam composite billet is changed without changing its volume. Reducing the thickness of a substantially fully dense billet without changing its volume is an example of deformation in situ. The constrained metallic matrix flows, but does not expand, when the billet is deformed in situ.

Without wishing to be bound by any theory, it is believed that the deformation force that the ceramic microballoons see is largely uniaxial in an unrestrained configuration, and largely omniaxial in a constrained configuration. The average unconstrained uniaxial crush strength determines the crush strength of an unconstrained syntactic metal foam composite, but, if it is constrained during deformation, the average omniaxial crush strength determines the crush strength of this composite. An unconstrained syntactic metal foam composite billet tends to flow away from the applied deformation force and to increase in volume. The regions were the ceramic microballoons are crushed in such an unconstrained composite generally are not uniformly distributed throughout this composite. The physical properties of such an unconstrained composite are variable and unpredictable.

Substantially intact walls of the included ceramic microballoons are generally visible under magnification in a cross-section of the finished deformation worked syntactic metal foam composites. That is, most (generally in excess of 90 percent) of the ceramic microballoons in the starting materials survive intact the processing steps by which the ceramic microballoons and matrix forming metals are processed into syntactic metal foam composites, and the deformation working by which such composites are converted into ductile syntactic metal foam composites. Most of the ceramic microballoons also survive the machining and forming operations by which the ductile syntactic metal foam composites are shaped into final products. The densities of certain embodiments of the syntactic metal foam composites, before and after deformation processing, are generally from about 40 to 60 percent of those of the pore free metal matrix alone.

The processing steps by which embodiments of the syntactic metal foam composite are formed include, in certain embodiments, applying a metallic coating to ceramic microballoons, particle cladding the resulting metallic coated microballoons with matrix forming metallic powder, forming a generally uniform perform mixture containing the metal coated and clad ceramic microballoons, subjecting the perform mixture to consolidation processing to form a green preform, solid state sintering the green preform to form a syntactic metal foam body that includes both syntactic and non-syntactic porosity. Non-syntactic porosity is removed from the resulting syntactic metal foam body by deformation forming the syntactic metal foam body to form a syntactic metal foam composite body that is substantially non-syntactic porosity free.

According to certain embodiments a uniform distribution of a low volume fraction of ceramic microballoons in a large volume fraction of matrix metal is achieved by building a thick coating of matrix forming material around each ceramic microballoon, wherein the coatings are approximately equal in thickness to one half of the desired spacing between the ceramic microballoons in the completed syntactic metal foam composites. When the thick coatings on the coated ceramic microballoons touch one another the ceramic microballoons are properly and uniformly spaced from one another. This spacing or at least proportional spacing is maintained in subsequent processing until a finished product is produced. The spacing between the ceramic microballoons may decrease as the volume of the body shrinks during some of the processing steps, but it decreases uniformly throughout the body. According to one embodiment, thick coatings of matrix forming material may be applied to ceramic microballoons in the form of a sprayed on slurry of powdered matrix forming material and conventional clean burning organic binder. When ceramic microballoons with such thick coatings of matrix forming metal are placed into mold, the ceramic microballoons automatically assume the desired spacing configuration. The balance of the matrix forming material (which may be the same as or different from the coating matrix metal) is then poured in to fill up the spaces between the coated ceramic microballoons. The binder is burned off. The green composite preform is then consolidated by sintering and pressing at a low pressure that is generally below approximately the omniaxial crush strength. Depending on the desired ceramic microballoon spacing, as much as 85 volume percent or more of the matrix forming metal may be in the thick coatings on the ceramic microballoons. The volume percent of the matrix forming metal in these coatings is determined by the desired spacing between the ceramic microballoons in the final product. Where a high volume fraction of ceramic microballoons is desired, these coatings may be thin or non-existent. According to certain embodiments the ceramic microballoons may or may not be given a more adherent coating of metal before the thick coatings are applied.

Certain embodiments comprise selecting a syntactic metal foam composite that is comprised of a metal matrix and ceramic microballoons wherein the syntactic metal foam composite is substantially fully dense except for a syntactic porosity that is provided by the ceramic microballoons. The syntactic porosity has a syntactic porosity volume. The ceramic microballoons have an average unconstrained uniaxial crush strength, and an average omniaxial crush strength, which is greater than the average unconstrained uniaxial crush strength. The metal matrix has a yield strength at a working temperature. The yield strength is less than the average omniaxial crush strength and more than the average unconstrained uniaxial crush strength. The syntactic metal foam composite is brought to approximately the working temperature. The syntactic metal foam composite is deformed to a predetermined shape while it is continuously constrained to a substantially constant volume. The deforming is carried out with a deformation force that is below approximately the average omniaxial crush strength, and is at least as great as approximately the yield strength. A resultant deformed syntactic metal foam composite is recovered that has a deformed syntactic porosity that is at least 90 percent, and in some embodiments, at least 95 percent of the original syntactic porosity volume. It is the matrix that is deformed, not the ceramic microballoons. The deformed syntactic porosity retains the shape that is defined by the ceramic microballoons, which is approximately spherical. According to a further embodiment, the selecting step includes selecting a syntactic metal foam composite in which the metal matrix has a liquidus temperature, and the bringing step includes bringing the syntactic metal foam composite to a working temperature that is between approximately 60 and 90 percent of the liquidus temperature.

In an additional embodiment, the selecting step includes selecting a syntactic metal foam composite that includes a solid discontinuous phase comprised of reinforcing material.

According to a further embodiment, the selecting step includes selecting a syntactic metal foam composite that has an undeformed density, and the recovering step includes recovering a deformed syntactic metal foam composite that has a deformed density that is no more than approximately 5 percent greater than the undeformed density.

In another embodiment, the selecting includes selecting a syntactic metal foam composite in which the ceramic microballoons have an average particle size of from approximately 1 micron to 500 microns.

In further embodiments, the deforming step includes deforming the syntactic metal foam composite to a predetermined shape in which at least a part of the predetermined shape has a cross-section that is no thicker than approximately 3 to 15 times the average particle size of the ceramic microballoons.

A further embodiment includes selecting a syntactic metal foam composite that has a metal matrix with a liquidus temperature of less than approximately 1,200 degrees centigrade.

An additional embodiment includes selecting a syntactic metal foam composite wherein the selecting includes commencing with a constrained mixture of ceramic microballoons and matrix forming material, forming a syntactic metal foam body from the continuously constrained mixture, and eliminating non-syntactic porosity from the syntactic metal foam body to form the selected syntactic metal foam composite.

An embodiment includes recovering a resultant deformed syntactic metal foam composite having a deformed syntactic porosity the volume of which is at least 95 percent of the volume of the original syntactic porosity.

Embodiments of a deformed syntactic metal foam composite include a metallic matrix phase containing a ceramic microballoon reinforcement phase. The metallic matrix phase exhibits physical properties characteristic of having been deformation worked. Such physical properties appear when compared with those of an undeformed syntactic metal foam composite that is a precursor to the deformed syntactic metal foam composite. Such physical properties include the ability to absorb, before crushing, at least about 1.5 to 2, or, in additional embodiments, 3, or 4, or 5, or 10, or more times the amount of energy required to crush the precursor syntactic metal foam composite. According to certain embodiments the metallic matrix phase comprises from approximately 30 to 60, or, in further embodiments, from approximately 35 to 50 volume percent of a ceramic microballoon reinforcement phase.

According to certain embodiments the physical properties of the deformed syntactic metal foam composite include the ability to absorb in crushing at least about 2 to 10, and in further embodiments, from about 3 to 10 times the amount of energy required to crush a precursor syntactic metal foam composite.

Some embodiments of deformed syntactic metal foam composites include a metallic matrix phase that comprises aluminum or aluminum alloys, or in further embodiments, titanium or titanium alloys.

Certain embodiments employ metallic matrix phases that have a melting point above about 1,200 degrees centigrade. Metallic elements, alloys and mixtures with such higher melting points are particularly suitable, for example, for use in high temperature environments, as well as in armor and blast absorption applications. Embodiments wherein the metallic matrix phase has a melting point below about 1,200 degrees centigrade are often particularly suitable for personal protection and crumple zones. However, some embodiments with higher melting point metal matrix materials are suitable for use for personal protection and crumple zones, while some lower melting embodiments are suitable for armor and blast absorption applications.

BRIEF DESCRIPTION OF THE DRAWINGS

For purposes of illustration, and not limitation, the following drawings are provided to illustrate certain, but not all, embodiments of the invention.

DETAILED DESCRIPTION OF THE EMBODIMENTS

In the following description, numerous specific details are set forth, such as component names and descriptions of components used in the context of lightweight metal matrix composites in order to provide a thorough understanding of the various embodiments of the claimed subject matter. One skilled in the relevant art will recognize, however, that these embodiments can be practiced without one or more of the specific details, or with a number of other methods or components.

References throughout this specification to "one embodiment," "certain embodiments," "additional embodiments," "further embodiments," or "an embodiment," or words of similar meaning, are intended to mean that a particular feature, structure, or characteristic described in connection with the embodiment is included in at least one embodiment of the present claimed subject matter. Thus, the appearances of the phrases "in one embodiment" or "in an embodiment," or phrases of similar meaning, in various places throughout this specification are not necessarily all referring to the same embodiment. Furthermore, the particular features, structures, or characteristics may be combined in any suitable manner in one or more embodiments.

The following Examples will serve to further describe the embodiments that presently are the best mode contemplated.

Example 1

Figure 1:
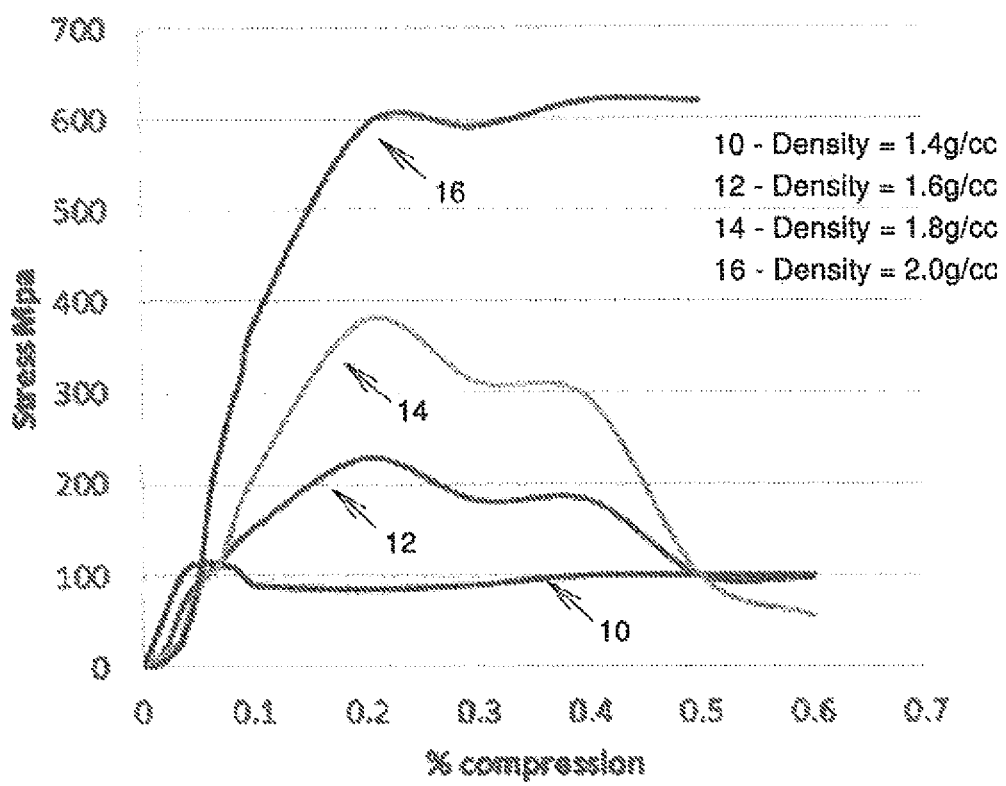
FIG. 1 is a plot of compression stress-strain curves for 4 different densities of syntactic metal foams. Stress is plotted in megapascals.
Figure 2:
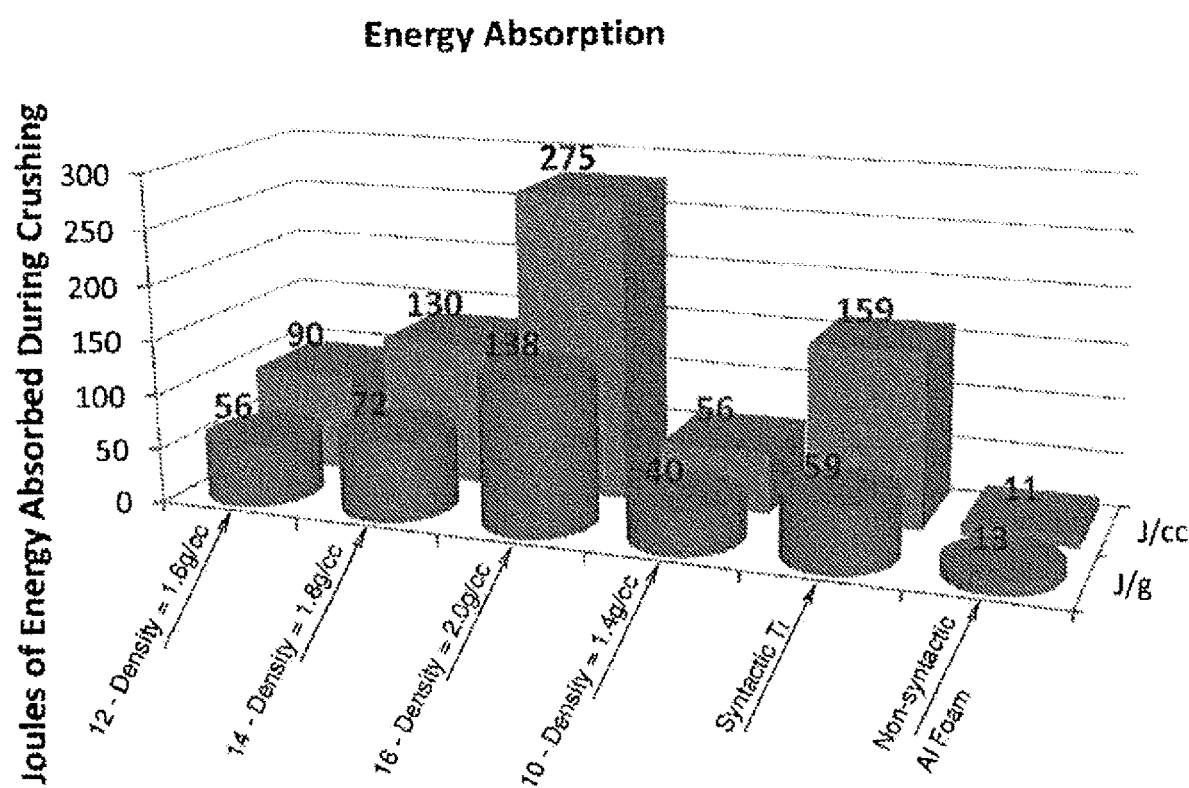
FIG. 2 is a plot, on the basis of both weight and volume, of joules of energy adsorbed during the crushing of 6 different materials. The four syntactic metal foams of FIG. 1 are plotted in FIG. 2 along with 2 other foamed materials.

Ceramic Alumino-silicate microballoons that were about 30 percent alumina and 70 percent silica were selected. These microballoons were approximately spherical, approximately 150 microns in diameter, with a particle size distribution of from approximately 5 microns to 180 microns, wall thicknesses equal to approximately 5 percent of their diameters, and densities of from about 0.6 to 0.8 grams per cubic centimeter (glee). These ceramic microballoons had an average uniaxial crush strength of from approximately 1,500 to 3,000 pounds per square inch, and an average omniaxial crush strength of at least approximately 25,000 pounds per square inch. These ceramic microballoons were chemical vapor deposition (CVD) coated with aluminum to form aluminum coated ceramic microballoons, each of which was about 10 percent by weight aluminum. A mixture was formed that consisted of about 40 volume percent aluminum coated ceramic microballoons and 60 volume percent aluminum powder (alloy 6061). The aluminum powder had an average particle size of about 10 microns. The mixture was formed by blending these powders together. The mixture was then pressed in a uniaxial press and sintered at about 500 degrees centigrade for about 1 hour. The continuously applied pressure was maintained at less than the crush strength of the included ceramic microballoons. The resulting specimen had a density of about 1.4 g/cc. The compressive stress-strain curve for this specimen is shown at 10 in FIG. 1. The energy absorbed in crushing this specimen on a weight basis was about 40 Joules per gram (J/g), and on a volume basis, was about 56 Joules per cubic centimeter (J/cc). This is reflected at 10 in FIG. 2.

Example 2

The aluminum coated ceramic microballoons and aluminum powder described in Example 1 were blended together in powder form. The blended mixture contained about 30 volume percent of aluminum coated ceramic alumino-silicate microballoons, and 70 volume percent of Aluminum powder. The blended mixture was then pressed in a uniaxial press and sintered at about 500 degrees centigrade for about 1 hour. The applied pressure was maintained at less than the average omniaxial crush strength of the included ceramic microballoons. The final product was about 2 inches thick, and had a density of about 1.6 g/cc. The compressive stress-strain curve for this product is shown at 12 in FIG. 1. The energy absorbed in crushing this product on a weight basis was about 56 J/g, and on a volume basis, was about 90 J/cc. This is reflected at 12 in FIG. 2.

Example 3

The final pressed and sintered product prepared in Example 2 was placed into a close-fitting mild steel can to constrain it during roll-reduction. The product was heated to about 400 degrees centigrade and roll-reduced in thickness from about 2 inches to about 1 inch. The sample was rolled approximately 10 times to achieve this 50 percent reduction and reheated to about 400 degrees centigrade between rolling cycles. After the roll-reduction was complete the can was removed. The final sample had a density of about 1.8 g/cc. The compressive stress-strain curve for this sample is shown at 14 in FIG. 1. The energy absorbed in crushing this sample on a weight basis was about 72 J/g, and on a volume basis, was about 130 J/cc. This is reflected at 14 in FIG. 2.

Example 4

The aluminum coated ceramic microballoons and aluminum powder described in Example 1 were blended together in powder form. The blended mixture contained about 40 volume percent of aluminum coated ceramic Al-silicate microballoons substantially uniformly mixed with about 60 volume percent of Aluminum powder. The mixture was then packed into a mild steel can using uniaxial pressure below the crush strength of the included ceramic microballoons. The completely filled can was evacuated and sealed. The mixture was heated to about 500 degrees centigrade, and roll reduced from a thickness of about 2 inches to one of about 0.9 inches. The constrained powdered mixture was rolled approximately 20 times to achieve this approximately 55 percent reduction in thickness, and was heated back to a temperature of about 500 degrees centigrade between each rolling cycle. The rolling pressure was kept below the average omniaxial crush strength of the included ceramic microballoons. Because the mixture was fully confined, this represents approximately a 55 percent reduction in the volume of the mixture. After rolling, the can was removed and the final billet was found to have a density of about 2.0 g/cc. Upon inspection the final billet was found to be substantially free of non-syntactic porosity. More than 90 percent of the original ceramic microballoons in the starting powdered mixture appeared intact in the final billet. The energy absorption capacity of this final billet on a weight basis was approximately 138 j/g, and 275 J/cc on a volume basis, as shown at 16 in FIG. 2. The compressive stress-strain curve for this billet is shown at 16 in FIG. 1.

Example 5

Glass microballoons having an average particle size of approximately 45 microns, a particle size distribution of from approximately 10 microns to 85 microns, and a particle density of about 0.3 grams per cubic centimeter were coated with aluminum using a chemical vapor deposition process. The aluminum coated glass microballoons were about 10 weight percent aluminum. They were subsequently V-blended (Patterson Kelly V-blender with intensifier bar) with 6061 aluminum powder at about 50 volume percent, and compression molded at approximately 15,000 pounds per square inch gauge (103 megapascals) and approximately 250 degrees centigrade for from about 10 to 30 minutes. The green parts were subsequently degassed and vacuum sintered at approximately 550 to 580 degrees centigrade for from about 4 to 6 hours to produce a lightweight syntactic aluminum metal foam composite. This aluminum composite had a density of about 1.5 grams per cubic centimeter, and a compressive yield strength of approximately 16,000 pounds per square inch gauge (110 megapascals). The resulting 0.5 inch thick composite plate was then fully constrained and rolled into a 0.062 inch thick sheet, which has a density of about 1.7 grams per cubic centimeter, a compressive strength of approximately 24,000 pounds per square inch gauge (165 megapascals). This sheet can be warm-formed into complex shapes such as cell phone or computer cases. This syntactic glass microballoon aluminum metal foam composite is suitable for EMI shielding cases for electronic equipment. It has a density lower than that of magnesium but with none of the corrosion problems commonly encountered with magnesium.

Example 6

Alumina-silicate microballoons having an average particle size of approximately 150 microns, a particle size distribution of from approximately 5 microns to 180 microns, and a particle density of about 0.6 grams per cubic centimeter were coated with about 50 weight percent aluminum powder (alloy 6061) slurry with a polyvinyl alcohol (PVA) binder in a fluidized bed (glatt, top-down sprayer). These microballoons were approximately spherical in form. The resulting coated ceramic microballoon were compressed in a mold at between approximately 6,000 and 7,000 pounds per square inch gauge (psig) at a temperature of between approximately 200 and 250 degrees centigrade. The resulting green parts were subsequently vacuum debound and sintered at approximately 550 degrees centigrade for from approximately 4 to 6 hours. The resultant syntactic metal foam body had a density of about 1.7 g/cc and a compressive yield stress of approximately 15,000 pounds per square inch.

Example 7

A syntactic aluminum foam body according to Example 6 was subsequently fully constrained and roll reduced from a 1 inch thick billet to a 0.5 inch thick plate. This roll reduction step increased density from about 1.7 to about 1.85 grams per cubic centimeter, and increased tensile strength to greater than approximately 12,500 pounds per square inch gauge. The tensile strain to failure was increased from about 1.5 to 2 percent to about 4 to 5 percent.

Repeating this example with further roll reduction to a density of approximately 2.0 grams per cubic centimeter will result in an increase in the strain to failure from a precursor syntactic metal foam body of about 1.5 to 2 percent to a strain to failure of about 6 to 7 percent for a deformed syntactic aluminum foam composite. Improvements in strain to failure performance of from approximately 2 to 6 or more times are to be expected from the practice of the present invention.

Embodiments include metal coated high strength ceramic microballoons having average particle diameters from approximately 1 to 100, and in further embodiments, 300, or 500 or more microns, and, in some additional embodiments, from approximately 5 or 30 to as much as approximately 300 or even 500 microns, and particle densities of from approximately 0.01 to 1.5 grams per cubic centimeter. The size distribution of the ceramic microballoons in any given embodiment may be controlled to a narrow range with a size variation of no more than approximately 10 or 20 percent, or it may vary by as much as approximately two orders of magnitude or more, depending on the design of the syntactic foam system. A wide variation in particle size may, for example, be desired for purposes of achieving a particular packing configuration in the syntactic metal foam. Relatively narrow ranges of particle size distribution may, for example, be used where a high degree of uniformity in physical properties is desired.

Certain embodiments provide ceramic microballoons that are coated with a metal for purposes of strengthening the ceramic microballoons, improving their wetability, and controlling the volume fraction and dispersion.

Such strengthening further reduces the small loss of syntactic porosity that inevitably occurs during the various processing steps that result in the production of deformed syntactic metal foam composites. The volume of syntactic porosity that is lost during processing is generally less than 10, and in some embodiments, less than 5 percent. In certain embodiments, a wetting agent, such as one component of a brazing alloy of the desired metal matrix is applied to the ceramic microballoons. The metallic coating is at least mechanically bonded to the microballoons. In further embodiments, chemical or metallurgical bonding may occur at least to a certain degree.

For some embodiments, the metallic coating on the ceramic microballoons and the matrix metal forming metallic powder are substantially the same, and in other embodiments, they are substantially different. For example, the metallic coating or the metallic powder, or both, may include a braze alloy or a transient liquid phase forming material. As used herein, unless otherwise indicated, "alloy" is intended to include the circumstance where the metallic coating on the ceramic microballoons and metallic matrix forming metal are substantially the same, as well as the circumstance where they are substantially different. The matrix forming metal of the syntactic metal foams may include, for example, aluminum, titanium, iron, nickel, copper, cobalt, magnesium, and their alloys with one another and with other elements, and the like.

Certain embodiments include selecting a loose particulate mass of ceramic microballoons that includes secondary reinforcement particles. Such reinforcements may, for example, take the physical form of angular particles generally spherical particles, elongated particles, or the like. Such reinforcements may include, for example, buckeyballs, nanotubes, ceramic particles with a size between about 0.01 and 30 microns, single and multi-walled nanotubes, ceramic microballoons with a size of less than about 0.5 microns, and the like. Secondary reinforcement particles include particles of all shapes. According to certain embodiments, the average reinforcement particle size is smaller than the average microballoon particle size by at least approximately an order (one tenth), or in further embodiments, two orders (one hundredth) of magnitude. Such particles are generally composed of materials that are stable and substantially retain their identity under the conditions at which the syntactic metal foam bodies are formed and used.

According to certain embodiments, at least some of the ceramic microballoons may include therewithin at least one active ingredient. Active ingredients include, for example, radiation adsorbing material, such as lithium borohydride, or sodium borohydride, neutron adsorbing material such as boron, or gadolinium. Such active ingredients also include thermally insulating materials such as, for example, an aerogel, or a thermal conductor such as, for example, graphite or carbon nanotubes, solid lubricants such as, for example, tungsten sulfide or barium fluoride.

Where strengthening the ceramic microballoons to withstand high deformation forces is a priority, high strength metals may be used as the coating material. For purposes of describing the strongly adhered coatings on ceramic microballoons only, "metals," unless otherwise indicated by context or otherwise, is intended to include strongly adherent coatings of high strength ceramics such as, for example, tungsten carbide. Even such elements and their alloys as tantalum and tungsten may be used where the yield strengths of the matrix metals at the available working temperatures are well above the omniaxial crush strengths of, for example, aluminum coated ceramic microballoons. Wetability and strength characteristics should be balanced against one another so that one is not entirely sacrificed for the benefit of the other. Also, the working temperature at which the syntactic metal foam composite is deformed must generally be below that at which the integrity of the ceramic microballoons is impaired. That is, if included ceramic microballoons soften, melt, loose a significant amount of their average omniaxial strength, decompose, react with the matrix materials, or are otherwise impaired at the selected working temperature at least temperature, at least an unacceptable amount, if not all, of the syntactic porosity of the syntactic metal foam composite may be lost. The matrix forming metals in the syntactic metal foam may include, for example, aluminum, titanium, iron, nickel, copper, cobalt, magnesium, and their alloys with one another and with other elements, and the like.

Embodiments of the resultant syntactic metal foam composites exhibit lower density as compared to solid metals, and higher strengths, energy absorption, ductility, elongation, and formability as compared to other metal foams. Embodiments of these syntactic metal foams have unique properties that facilitate their use in multiple applications, such as marine structures, ballistic armor, EMI shielding, space vehicles, automobiles, and buildings. Embodiments are particularly useful in applications where weight and energy absorption are important, such as, for example, blast panels for military applications, and crumple zones for automotive or railcar crash protection.

Generally, syntactic metal foam is prepared by filling in the spaces around the ceramic microballoons with a metal that is consolidated to create a solid matrix. These filling and consolidation operations may be carried out by various techniques, including, for example, conventional powder metallurgy sintering, transient metal sintering, liquid forming techniques, and, in some embodiments, casting techniques.

Embodiments of syntactic metal foams, largely due to their controlled, spherical porosity (through use of preformed ceramic microballoons), exhibit highly improved mechanical properties, particularly under compression loading, as compared with non-syntactic foamed metals. The strength of certain embodiments of the syntactic metal foams is also much higher than other metallic hollow sphere foams. Furthermore, the energy absorption capacity of these embodiments is much greater than that of the bulk material used in the foams (in certain embodiments, on the order of 30 times to 70 times greater), while these foams also exhibit densities well below that of the bulk metal matrix materials. Certain embodiments provide, for example, alumino-silicate microballoons in a metal matrix comprising an aluminum alloy, or a titanium matrix with carbon microballoons as the discontinuous syntactic phase.

In certain embodiments, metal coated ceramic microballoons are blended with a metal binder and placed in a mold, the spaces around the hollow metallic pieces are filled with a matrix-forming metal powder followed by heating the mold to a sintering temperature, thereby forming a solid metal matrix around the ceramic microballoons. Various packing techniques, such as vibrating the mold at a specific frequency, or varying frequencies, can be used for maximizing packing density of the coated ceramic microballoons within the mold. Further, such techniques can also be used during the step of filling the spaces around the ceramic microballoons to facilitate movement of the metal powder through the mold and around these microballoons. The range of size distribution of these microballoons may be selected to achieve a desired packing density. Further, pressure may be applied to the coated ceramic microballoons and the matrix-forming metal powder within the mold, as would commonly be done in powder metallurgy techniques. Such compression within the mold can be applied for the duration of the sintering step.

According to certain embodiments, a plurality of metal coated ceramic microballoons are packed in a mold, and a matrix-forming molten metal is poured into the mold, thereby filling the voids around the coated ceramic microballoons. The liquid metal is allowed to solidify, thereby forming a metal matrix around the ceramic microballoons. The use of a coating of metal can be used to control the packing density and spacing of the ceramic spheres, as well as to control the wetting and infiltration of the molten metal matrix phase.

The strength and mechanical properties of syntactic metal foam bodies can generally be further improved through additional thermomechanical processing to form syntactic metal foam composites. Thermomechanical processing includes, for example, hot-forging, hot-extruding, or hot roll compressing the syntactic metal foam body. According to certain embodiments, these syntactic metal foam bodies that were pressed and sintered, but with considerable non-syntactic porosity (for example, 10 to 20 percent) were heated to temperatures at which the yield strengths of the matrix metals were approximately equal to the average omniaxial crush strengths of the included ceramic microballoons, and roll-reduced at 20 to 50 percent reduction ratios to eliminate residual porosity not created by the included ceramic microballoons. Reduction of the volumes of the pressed and sintered syntactic metal foam bodies without significantly reducing the syntactic porosity was accomplished by continuously constraining these hot bodies as they were roll-reduced. This continuous constraining as the volumes of the bodies decreased prevented the hot syntactic metal foam bodies from just flowing under pressure to different shapes at more or less constant or larger volumes. The physical properties of the resulting substantially non-syntactic pore free syntactic metal foam composites were substantially improved as compared to those of the precursor syntactic metal foam bodies. Alternate techniques, such as hot extrusion and hot-forging can also be used to create syntactic metal foam composites with similar strengthening, energy absorption capacity, and ductilizing effects. The use of high strength ceramic microballoons enabled post fabrication deformation working of syntactic metal foam bodies to be carried out without crushing a significant fraction of the included ceramic microballoons. Such crushing would eliminate the syntactic porosity. For example, continuously constrained deformation forming by roll milling increased the density of a syntactic metal foam body from a density of about 1.8 grams per cubic centimeter to about 2.0 grams per cubic centimeter in the resulting syntactic metal foam composite. The syntactic metal foam body, with a density of about 1.8 grams per cubic centimeter, exhibited an undeformed plateau strength of about 380 megapascals (MPa). Deformation forming to a density of about 2.0 grams per cubic centimeter increased the plateau strength to about 600 megapascals. Roll milling deformation forming under continuous constraint took the ductility of the 1.8 grams per cubic centimeter material from less than about 1 percent elongation to an elongation of more than about 4 percent. Such improvements in the physical properties of syntactic metal foam bodies occurred without decreasing the volume of the syntactic porosity by more than approximately 1 to 10 percent, and in further embodiments from about 1 to 5 percent. Deformation forming induced density changes generally ranged from approximately 5 to 20 percent, and in some embodiments from approximately 10 to 15 percent. Deformation forming induced increases in plateau strength ranged from at least approximately 2 fold to as much as approximately 4 fold, and as much as approximately 5 to 6 fold according to certain embodiments. Because most of the syntactic porosity survived the continuously constrained deformation processing step, the article remained considerably lighter than the metal of which the matrix was composed, for example, from 5 to 50 percent less than the weight of the solid pore free matrix metal, and in some embodiments from 10 to 30 percent less. The magnitude of the deformation induced physical improvements depends in part on the characteristics of the specific matrix metals that are involved. The ability to subsequently deform these syntactic metal foam composites by, for example, roll reduction, extrusion, or forging enables the production of metal plate, sheet, and foil, as well as complex net shape cross-sections and articles such as stiffened or lightweighted structures.

A substantially fully dense syntactic metal foam composite was formed directly from a substantially uniform powdered mixture of metallic coated ceramic microballoons and powdered matrix forming metal without forming a syntactic metal foam body in an intermediate step. A constraining device in the form of a deformable container made of mild steel with an initial volume was selected. The generally uniform powdered mixture was introduced into the constraining device so that the powdered mixture substantially completely filled the initial volume. The container was evacuated and closed. The container and the powdered mixture therein were heated to a temperature (measured in centigrade) in the range of from approximately 75 to 100 percent of the liquidus point of the matrix metal. The heated container-powdered mixture was subjected to a densification force that was sufficient to reduce the initial volume to a substantially fully dense volume, wherein substantially all of the void volume in the resulting syntactic metal foam composite was due to syntactic porosity. The densification force and temperature were controlled so that non-syntactic porosity was substantially eliminated from the matrix metal phase, but very few of the included ceramic microballoons were crushed. This is indicated by the fact that the density of the resulting syntactic metal foam composite was approximately equal to the pore free density of the matrix metal less the particle density of the included ceramic microballoons. The presence of syntactic porosity in the syntactic metal foam composite was confirmed by microscopic examination of a cross-section of the composite. More than 90 percent of the syntactic porosity available from the ceramic microballoons in the original powdered mixture appeared in the resulting syntactic metal foam composite. The powdered mixture was continuously constrained by the container as the volume of the powdered mixture was reduced. The applied densification force was greater than the average unconstrained uniaxial crush strength, but less than the average omniaxial crush strength of the included ceramic microballoons. The volume reduction was accomplished by deforming the container in a rolling mill with the powdered mixture confined therewithin. The deformed container was removed from the resulting syntactic metal foam composite.

According to certain embodiments, a powdered mixture was heated to a temperature in the range between from approximately three-quarters of the liquidus point of the matrix metal to the liquidus point of the matrix metal (the temperature scale extended from zero degrees centigrade to the liquidus point of the matrix metal). A densification force that was sufficient to reduce the initial volume of the mixture to a substantially fully dense volume (except for syntactic porosity) was applied. The powdered mixture was continuously constrained by a restraining device as its volume was reduced. According to some embodiments, the volume reduction was accomplished by using a deformable restraining device that was crushed with the powdered mixture confined therewithin.

According to further embodiments, the ceramic microballoons can be filled with a variety of materials without necessarily affecting the fabrication or properties of the syntactic metal foams. For example, gamma ray absorbers such as generally spherical lithium borohydride particles may be silica coated to form lithium borohydride filled ceramic microballoons, and then fabricated according to the teachings herein to produce a high strength sheet having the multifunctional properties of radiation absorption, lightness, high energy absorption capacity, high strength, and high ductility, particularly as compared with single purpose radiation shields or other foamed metals. Similarly, the microballoons can be made by ceramic encapsulating high thermal conductivity carbon material (with or without a liquid or other transport media) to produce high thermal conductivity materials, or with WS2, BaF2, or other solid lubricant materials to produce a self-lubricating bearing or friction material.

According to embodiments in which syntactic metal foams are made through casting routes, the use of coated ceramic microballoons generally enables the fabrication of components without the complication and difficulty of vacuum casting equipment. The use of thick metallic coatings on the ceramic microballoons enables the balloons to retain their spacing inside a mold without disturbance during casting, and can prevent the formation of dry pockets or clusters during the fabrication process, particularly at microballoon loadings less than approximately 50 to 60 volume percent, and according to further embodiments, at microballoon loadings of from approximately 35 to 50 volume percent.

The elimination of cluster and other microballoon to microballoon contacts significantly improves the toughness and ductility of the resultant foams (particularly in tension), and further enables the resulting composites to be mechanically deformed to produce complex shapes, plate, and sheet products. The presence of well-bonded, uniformly dispersed ceramic microballoons enables syntactic metal foam composites to be warm or hot-formed by such processes as rolling, forging, or extrusion. The capability to perform such subsequent working steps enables economic production of sheet and plate products with highly uniform properties, particularly from aluminum or magnesium based powder metallurgy derived materials. Such aluminum and magnesium based powder metallurgy derived materials generally require deformation and recrystallization to eliminate weak interfaces between the powder metal particles at the prior particle grain boundaries. The ability to deform and work the syntactic metal foam bodies in situ after they are solidified also enables work-strengthening and grain refinement of the metal matrix phase, which is generally difficult to accomplish by other methods such as quenching, due to the thermal properties of the ceramic microballoon containing syntactic metal foams. The use of powder metallurgy techniques, according to certain embodiments, enables the use of complex alloys, refined grain sizes, and the incorporation of secondary reinforcements or additives into the matrix phase to further lighten or strengthen the materials, for example, through the addition of carbon nanotubes into aluminum.

Embodiments of the syntactic metal foams may be advantageously substituted for other materials. For example, advantages in various physical properties may be achieved by substituting syntactic aluminum matrix foam composites for solid magnesium, syntactic titanium matrix foam composites for solid aluminum, and syntactic iron matrix foam composites for solid titanium.

According to those embodiments in which a particle cladding step is carried out, the metallic coated microballoons are clad with matrix forming metallic powder. A preform mixture in which the metallic coated microballoons are substantially uniformly clad with particles of matrix forming metallic powder is recovered from the particle cladding step. Under magnification, the individual particles are identifiable, and they appear to be loosely adhered to the surfaces of the coated microballoons. They are not as strongly bonded as the metallic coating. In general, many of the particles can be rubbed off of the coated microballoon surfaces if the particle clad microballoons are tumbled together for a few minutes (about 5 to 10 minutes). The metallic coating cannot be rubbed off of the surface of the microballoons by such tumbling. According to certain embodiments, substantially all of the matrix forming metal is present either as cladding particles or metallic coating on the microballoons. In certain embodiments, the average particle size of the cladding particles is at least about an order of magnitude (one tenth) smaller than the average particle size of the metallic coated microballoons.

A metallic coating is applied to the microballoons in such a manner as to form at least a mechanical bond to the surface of the microballoon. Suitable application procedures include conventional electroless plating, chemical vapor deposition, physical vapor deposition, and other conventional metal coating operations. The metallic coating serves several functions, including, for example, strengthening the microballoons, the green performs, and the final syntactic composite bodies, preventing the microballoons from being crushed during the green preforming and deformation steps, enhancing sintering, and providing a source of liquid metal for purposes of transient liquid sintering. The amount of metallic material applied to the surface of the microballoon in certain embodiments is sufficient to form metallic coated microballoons, but is generally less than would be required to form the metallic matrix. That is, the addition of a metal matrix forming material in addition to the metallic coating is generally desirable.

While the detailed description of the claimed subject matter has been described with reference to multiple embodiments, it should be understood by those skilled in the art that various changes and modifications may be made and equivalents may be substituted for elements thereof without departing from the scope of the claimed subject matter. Therefore, the claimed subject matter is not limited to the various disclosed embodiments including the best mode contemplated for carrying out the claimed subject matter, but instead includes all possible embodiments that fall under the subject matter to be claimed.

What is claimed is:

1. A method for forming a syntactic metal foam composite that is substantially free of non-syntactic porosity comprising:

providing ceramic microballoons;

applying a metal coating to an outer surface of said ceramic microballoons to form metal-coated microballoons;

particle cladding said metal-coated microballoons with a matrix-forming metallic material to form cladded metal-coated microballoons;

consolidating said cladded metal-coated microballoons to form a green preform;

sintering said green preform to form said syntactic metal foam, said syntactic metal foam formed of said ceramic microballoons and a metal matrix positioned between said ceramic microballoons, said syntactic metal foam having both syntactic and non-syntactic porosity, said syntactic porosity provided by said ceramic microballoons, said syntactic porosity having a syntactic porosity volume, said ceramic microballoons having an average unconstrained uniaxial crush strength, and an average omniaxial crush strength that is greater than said average unconstrained uniaxial crush strength, said metal matrix having a yield strength at a working temperature, said yield strength is less than said average omniaxial crush strength and more than said uniaxial crush strength; and, deforming said syntactic metal foam to substantially remove said non-syntactic porosity from said syntactic metal foam.

2. The method as defined in claim 1, wherein said matrix-forming metallic material includes metal powder and a binder.

3. The method as defined in claim 1, further including a step of deforming said syntactic metal foam composite to a predetermined shape while continuously constraining said syntactic metal foam composite to a substantially constant volume, said step of deforming is carried out with a deformation force that is below approximately said average omniaxial crush strength, and at least as great as approximately said yield strength.

4. The method as defined in claim 1, wherein said metal matrix has a liquidus temperature, and said working temperature being 60-90% of said liquidus temperature.

5. The method as defined in claim 1, wherein said syntactic metal foam composite includes a solid discontinuous phase comprised of reinforcing material.

6. The method as defined in claim 1, wherein said ceramic microballoons have an average particle size of 1-500 microns.

7. The method as defined in claim 6, wherein said syntactic metal foam composite after said step of deforming has a cross-section size that is 3-15 times said average particle size of said ceramic microballoons.

8. The method as defined in claim 1, wherein said metal in said matrix-forming metallic material includes aluminum, aluminum alloy, titanium, or titanium alloy.

9. The method as defined in claim 1, wherein a plurality of said metal-coated microballoons are each formed of a ceramic microballoon that is coated with a metal material, said ceramic microballoon constituting a greater weight percent of said metal-coated microballoon than a weight percent of said metal coating, said metal coating on said ceramic microballoon formed by chemical vapor deposition or by immersion in a metal slurry.

10. The method as defined in claim 1, wherein a weight percent of said metal matrix material is greater than a weight percent of said microballoons in said syntactic metal foam composite.

11. The method as defined in claim 1, wherein an average particle size of said metal in said matrix material prior to said step of sintering is less than an average particle size of said metal-coated microballoons.

12. The method as defined in claim 1, wherein a composition of said coating of metal material on said metal-coated microballoons is the same as a composition of said metal in said metal matrix material.

13. The method as defined in claim 1, wherein said ceramic microballoon is formed of a material selected from the group consisting of carbon, glass, graphite, metallic oxides, metallic carbides, metallic nitrides, and metal silicates.

14. The method as defined in claim 13, wherein said ceramic microballoon is formed of a material selected from the group consisting of glass and metal silicates.

15. The method as defined in claim 1, wherein said composition of said meal coating and said metal in said metal matrix material is aluminum.

16. The method as defined in claim 1, wherein said ceramic microballoon has a particle size of 5-180 microns, a density of 0.6-0.8 grams per cubic centimeter, an average uniaxial crush strength of 1,500-3,000 pounds per square inch, and an average omniaxial crush strength of at least 25,000 pounds per square inch.

17. The method as defined in claim 16, wherein said metal-coated microballoon is a glass microballoon coated with aluminum, said glass microballoon having a particle size of 10-85 microns and a particle density of about 0.3 grams per cubic centimeter.

18. A method for forming a syntactic metal foam composite that is substantially free of non-syntactic porosity comprising:

providing ceramic microballoons;

applying a metal coating to an outer surface of said ceramic microballoons to form metal-coated microballoons, said metal-coated microballoons having a particle size of 1 to 500 microns, said ceramic microballoon constituting a greater weight percent of said metal-coated microballoon than said coating of metal material;

particle cladding said metal-coated microballoons with particles of a matrix-forming metallic material to form cladded metal-coated microballoons;

consolidating said cladded metal-coated microballoons to form a green preform;

sintering said green preform to form said syntactic metal foam, said syntactic metal foam formed of said ceramic microballoons and a metal matrix positioned between said ceramic microballoons, said syntactic metal foam having both syntactic and non-syntactic porosity, said syntactic porosity provided by said ceramic microballoons, said syntactic porosity having a syntactic porosity volume, said ceramic microballoons having an average unconstrained uniaxial crush strength, and an average omniaxial crush strength that is greater than said average unconstrained uniaxial crush strength, said metal matrix having a yield strength at a working temperature, said yield strength is less than said average omniaxial crush strength and more than said uniaxial crush strength; and, deforming said syntactic metal foam to substantially remove said non-syntactic porosity from said syntactic metal foam.

19. The method as defined in claim 18, wherein said metal coating on said ceramic microballoon is formed by chemical vapor deposition or by immersion in a metal slurry prior to combining said metal-coated microballoons with said matrix-forming metallic material.

20. The method as defined in claim 18, wherein a weight percent of said matrix-forming metallic material is greater than a weight percent of said metal-coated microballoons in said syntactic metal foam composite.

21. The method as defined in claim 18, wherein an average particle size of said matrix-forming metallic material prior to sintering said metal-coated microballoons and said matrix-forming metallic material is less than an average particle size of said metal-coated microballoons.

22. The method as defined in claim 18, wherein a composition of said coating of metal material on said metal-coated microballoons is the same as a composition of said matrix-forming metallic material.

23. The method as defined in claim 18, wherein said ceramic microballoon is formed of a material selected from the group consisting of carbon, glass, graphite, metallic oxides, metallic carbides, metallic nitrides, and metal silicates.

24. The method as defined in claim 18, wherein said composition of said coating of metal material on said metal-coated microballoons and said composition of said metal in said matrix material is aluminum.

25. The method as defined in claim 18, wherein said metal coated microballoon is a glass microballoon coated with aluminum, said glass microballoon having a particle size of 10-85 microns and a particle density of about 0.3 grams per cubic centimeter, said metal matrix material formed of aluminum.

\* \* \* \* \*